United States Patent
Ursel et al.

[11] 3,832,751
[45] Sept. 3, 1974

[54] WIPER ARRANGEMENT FOR USE WITH CURVED SURFACES

[75] Inventors: Eckhard Ursel; Horst Seibicke, both of Altschweier; Willi Schaper, Buhl, all of Germany

[73] Assignee: Robert Bosch GmbH, Stuttgart, Germany

[22] Filed: Apr. 28, 1972

[21] Appl. No.: 248,541

[30] Foreign Application Priority Data
June 9, 1971 Germany.......................... 2128677

[52] U.S. Cl......... 15/250.23, 15/250.16, 15/250.35, 15/250.36
[51] Int. Cl............................. B60s 1/32, B60s 1/38
[58] Field of Search....... 15/250.35, 250.13, 250.16, 15/250.19, 250.30, 250.34, 250.22

[56] References Cited
UNITED STATES PATENTS

| | | | |
|---|---|---|---|
| 2,284,844 | 6/1942 | Rappl | 15/250.19 |
| 2,399,652 | 5/1946 | Rappl | 15/250.30 |
| 2,593,073 | 4/1952 | Trevaskis | 15/250.35 |
| 3,139,644 | 7/1964 | Smith | 15/250.30 |
| 3,387,316 | 6/1968 | Pearse | 15/250.35 X |
| 3,447,187 | 6/1969 | Barrett | 15/250.16 |
| 3,493,804 | 2/1970 | Fennell | 15/250.22 X |
| 3,599,269 | 8/1971 | Congdon | 15/250.04 |
| 3,718,941 | 3/1973 | Deutscher et al. | 15/250.23 |

FOREIGN PATENTS OR APPLICATIONS

| | | | |
|---|---|---|---|
| 848,577 | 9/1960 | Great Britain | 15/250.35 |

*Primary Examiner*—Peter Feldman
*Attorney, Agent, or Firm*—Michael S. Striker

[57] ABSTRACT

A wiper arrangement is to be used on the lens of a vehicle light. An elongated elastically deformable wiper blade having a lip is provided with the lip being adapted to contact the exposed surface of the lens which is spherically curved. A mounting arm engages the wiper blade and holds the same in position adjacent the surface and a drive shaft is connected with the mounting arm for moving the same, and thereby the wiper blade, in alternately reversed directions over the surface. The axis of the drive shaft is oriented either to intersect or at least to extend in direction substantially towards the center of curvature of the lens.

10 Claims, 11 Drawing Figures

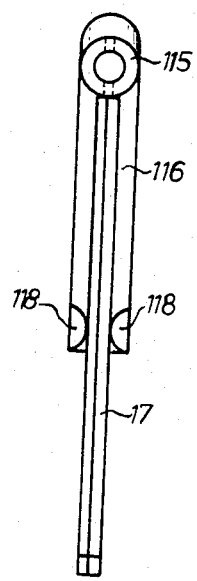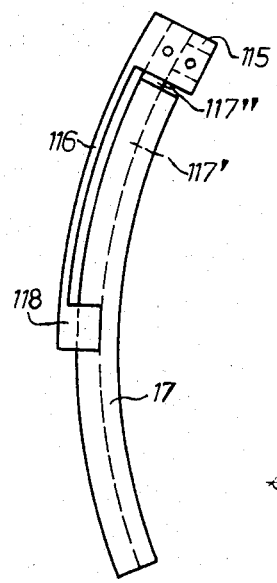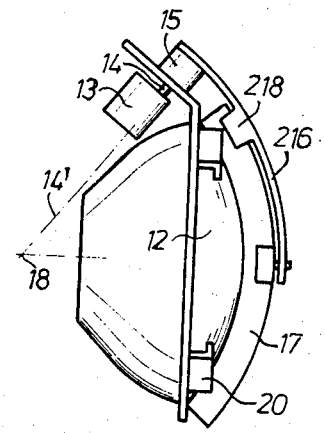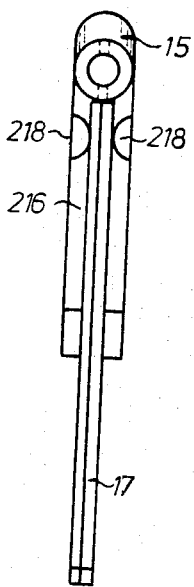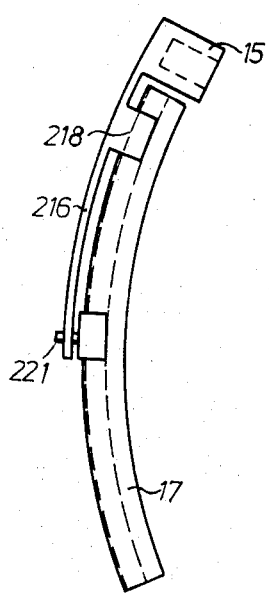

WIPER ARRANGEMENT FOR USE WITH CURVED SURFACES

BACKGROUND OF THE INVENTION

The present invention relates generally to a wiper arrangement, and more particularly to a wiper arrangement for curved surfaces or windows, especially for curved lenses on vehicle lamps or lights.

In modern high-speed driving it is becoming less and less acceptable that the light output of vehicle lamps, especially headlights, be reduced significantly by accummulations of dust, dirt, mud or the like on the lenses of such lights. As a result of this, wiper arrangements for wiping such lenses have been developed and are being progressively introduced in production. These wiper arrangements are analogous to the well-known windshield wipers, but of course have to overcome certain problems specific to their particular use.

One known arrangement from the prior art provides a wiper blade which corresponds in its length to about half the circumference of the lens to be wiped, and in rest position the blade is located at the periphery of the lens. One end of the blade is fixedly mounted and the other end is connected with a wiper shaft with both of the blade ends being located in a plane of symmetry passing through the lens and with the axis of the wiper shaft extending approximately parallel to a horizontal passing through the center of the lens. When in this arrangement the wiper shaft is driven, it pushes that end portion of the wiper blade which is connected with it out of one end position over the surface of the lens until the wiper blade which, as a result of this movement becomes deformed and thus gradually tensioned will automatically snap over into the opposite end position.

This prior-art arrangement has been found to be quite satisfactory, but only when the surface of the lens which is to be wiped, is planar. If, however, the surface (or indeed the entire lens) is curved, then the wiper blade tends in operation to lift its opposite ends off the surface of the lens and separate means must be provided for pushing the blade on to the lens during the entire wiping movement and over the entire length of the blade. This is undesirable for various reasons, in terms of expenses as well as complexity and resulting potential malfunction.

SUMMARY OF THE INVENTION

It is, accordingly, a general object of the present invention to provide an improved wiper arrangement which avoids the disadvantages of the prior art.

More particularly, it is an object of the present invention to provide such an improved wiper arrangement, which is simple in its construction, relatively inexpensive and reliable in its operation.

An additional object of the invention is to provide such an improved wiper arrangement in which it is assured that the wiper blade will be in contact over the entire length of its wiping lip with the surface of the window or lens being wiped, even when the same is curved, and in each and every position which the wiper blade can assume during its wiping operation.

In pursuance of these objects and of others which will become apparent hereafter, one feature of the invention resides in a wiping arrangement for use with curved windows, particularly lenses on motor-vehicle lamps, which arrangement comprises, briefly stated, an elongated elastically deformable wiper blade having a lip adapted to contact a surface of a window to be wiped. A mounting arm engages the wiper blade and holds the same in position adjacent the surface, and a drive shaft is connected with said mounting arm for moving the same, and for thereby moving the wiper blade in alternately reversed directions over the surface. The drive shaft has an axis which according to the present invention is oriented in direction towards the center of curvature of the window.

With the arrangement according to the present invention, the wiper blade will have in any position which it can assume during its wiping operation, a curvature which at least approximates the curvature which it has in rest position, so that it will always be in contact over the entire surface of its wiping lip with the surface of the window without requiring additional and separate biasing means for biasing it into such engagement.

The opposite end portion of the wiper blade, which latter is elastically deformable in the direction in which it advances during wiping, may according to a further concept of the invention cooperate with abutments provided in the region of the periphery of the window, and the wiper blade is connected with the wiper arm intermediate its ends. In this construction the material of the wiper blade in the region of the connection of the wiper blade with the wiper arm will be bent through by the wiper arm as the latter changes direction in response to a change in direction of rotation of the drive shaft, so that the wiper blade is capable of wiping even marginal regions of the window which are outwardly curved, for instance, such regions as occur in circular or oval windows which are curved. When the wiper blade moves out of the direction which it assumes on reversal of its movement then the elastic material (rubber or another elastomer) of the wiper blade will stretch again. It is advantageous but not necessary that each end of the wiper blade is associated with two abutments provided in the region of the window periphery.

If two abutments are provided for each end, and are spaced from one another in the wiping direction of the blade then the arrangement is particularly suitable for cleaning of elongated windows whose marginal regions are curved outwardly.

A particularly simple embodiment of the invention, especially suited for circular windows or lenses, utilizes a wiper blade in which that end of the blade which is closer to the drive shaft is connected by an elastic strip with the hub of the wiper arm by means of which the latter is connected with the drive shaft, and which hub thus constitutes an abutment for the blade end. In such an embodiment the proper and reliable guidance of the blade is assured particularly, if according to a further concept, the wiper arm is provided with two holding portions which engage the lateral sides of the wiper blade and loosely guide the same between them, because the wiper blade is then connected with the wiper arm at two points or locations.

It is advantageous, according to a further concept, if the end of the wiper blade which is adjacent or closer to the drive shaft is connected with an elastic strip with a bushing which is loosely turnably mounted on the drive shaft downwardly of the hub of the mounting arm, and which bushing thus constitutes an abutment.

It is further possible to provide an arrangement according to the present invention in which the wiper arm has a free end connected with the wiper blade by means of bolt which points towards the hub and pivotably connects the wiper arm with the wiper blade. In the region of its hub the wiper arm or mounting arm will have mounting portions which engage the side faces of the wiper blade and loosely guide the latter between them. This also provides for a two point connection of the wiper blade with the wiper arm and assures an improved guidance for the wiper blade. At the same time, the two mounting portions constitute abutments so that two separate abutments must only be provided at that side of the window (and in that region of the wiper blade) which is remote from the drive shaft. With such a construction the wiper blade can bond, because of the presence of the bolt which points toward the window and about whose axis the wiper blade is turnable.

Abutments provided separately, that is rather than constituted by the mounting portions of the wiper arm, can be formed in a very simple manner on a cover for the periphery of the window.

The form of the wiper arm advantageously is accommodated to the contour of the window periphery in the region where the wiper blade takes its rest position, and in such a case, all components of the arrangement are withdrawn from interference with the window when the wiper arrangement is at rest.

A particularly simple construction is achieved if the elastic strip which connects one end of the wiper blade is an end portion of a strip of spring steel, or the like which is embedded in the wiper blade and reinforces the same while retaining it flexible.

Abutments provided should advantageously be higher than the wiper blade itself, and have a portion which extends above the wiper blade when the latter is in the rest position, to assure that even in the rest position the wiper blade is reliably held against displacement or loss even if it is subjected to substantial vibrations or the like.

The wiper arm may be spring-biased towards the surface of the window, to facilitate the wiping results obtained when the wiper blade moves over this surface.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 6 illustrates, in an enlarged scale and in a view of the lip of the wiper blade, a detail of the arrangement in FIGS. 5 and 5a;

FIG. 7 is a side view of FIG. 6;

FIG. 8 is a side view of still another embodiment of the invention;

FIG. 9 is an enlarged detail view of a detail of FIG. 8; and

FIG. 10 is a side view of FIG. 9.

DESCRIPTION OF THE PREFERRED EMBODIMENTS

Figure 1:
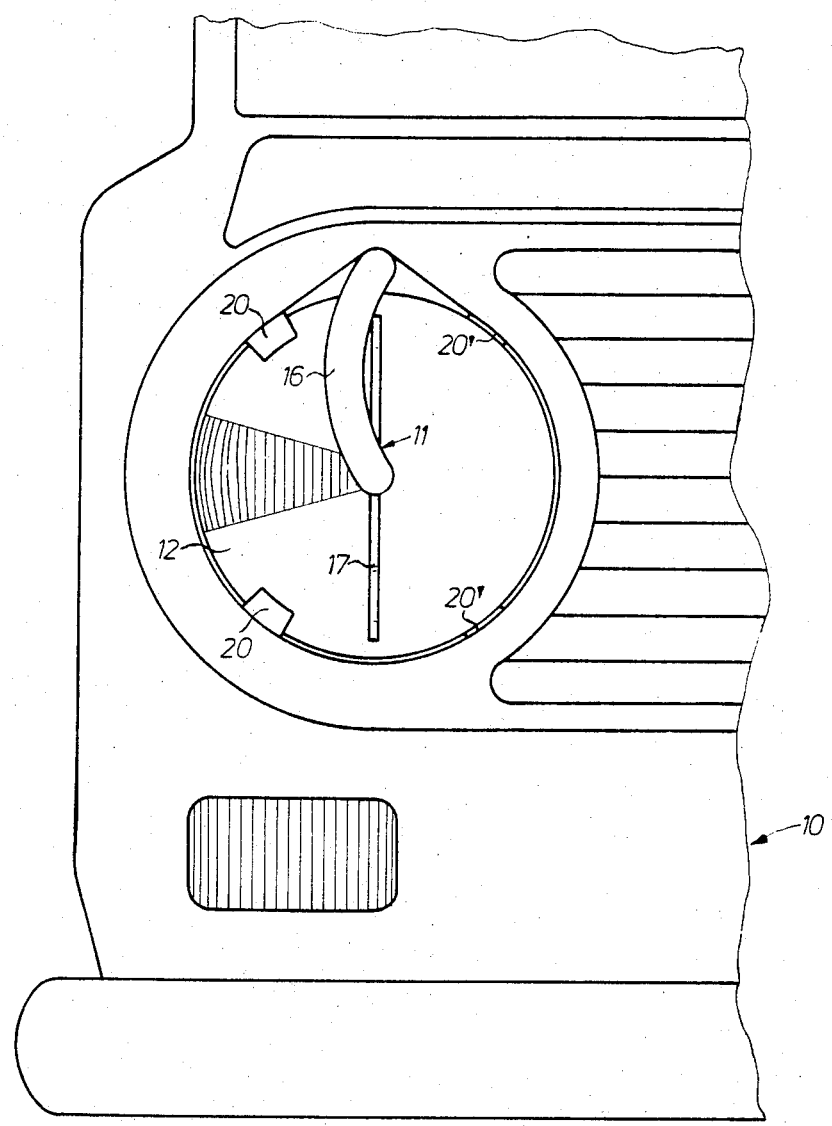
FIG. 1 is a fragmentary front elevational detail view of a motor vehicle, illustrating a vehicle headlight lens with a wiper arrangement according to the present invention.

Discussing the drawing now in detail, and firstly the embodiment illustrated in FIGS. 1 – 4, it will be seen that by way of example there has been illustrated in FIG. 1 a motor vehicle 10 which is shown only in part. The vehicle 10 has a headlight of which of course more than one be usually provided and it should also be understood that the wiper arrangement according to the present invention is suitable not only with headlights but also with separate search lights which can be mounted on such vehicles, with the tail lights or the like. In any case, in this embodiment, the headlight has a circular light outlet provided with a spherically curved lens 12 with which there is associated a wiper arrangement 11 in accordance with one embodiment of the invention.

Figure 2:
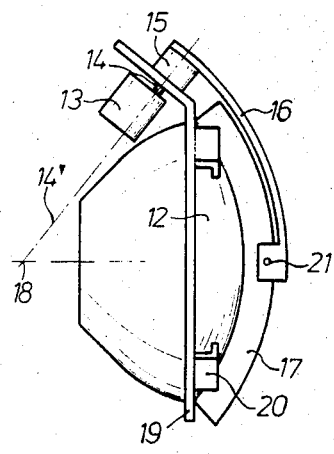
FIG. 2 is a side-elevational view of a vehicle headlight lense with the wiper arrangement of FIG. 1.
Figure 3:
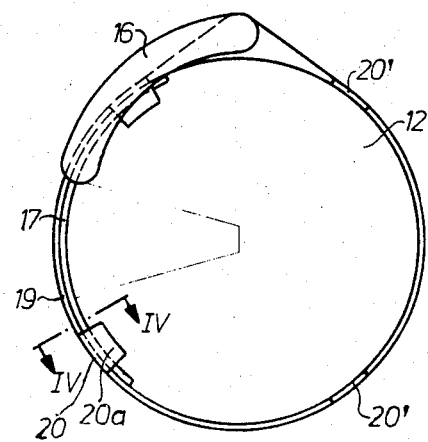
FIG. 3 illustrates the arrangement of FIG. 1 with the wiper blade in rest position.
Figure 4:
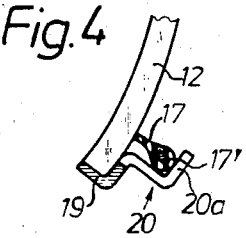
FIG. 4 is a section taken on line IV—IV in FIG. 3, on an enlarged scale.

FIGS. 2 – 4 show details of the arrangement 11. In FIG. 2 there will be seen that there is provided a drive motor 13 which is electrically driven and which has an oscillating driven drive shaft 14 provided with a hub 15. A wiper arm 16 or mounting arm 16 is connected via the hub 15 with the shaft 14 to share the movements thereof. The arm 16 is so spring tensioned that it will maintain a wiper blade 17 in contact with the exposed surface of the lens 12, with the wiper blade 17 being of resiliently flexible material (a natural or synthetic elastomer) and being pivoted to the arm 16.

The blade 17 has a wiping lip with which it engages the surface of the lens 12 and which is accommodated to the curvature of the lens. Drive motor 13 is located in the illustrated embodiment above the headlight and the axis 14' of the drive shaft 14 is directed towards the center of curvature 18 of the lens 12 in accordance with the present invention.

To assure that the blade 17 is elastically deformable in the direction of wiping, that is the direction in which it moves over the surface of the lens 12, a strip-shaped or band-shaped strip of spring material 17' is embedded in the blade and whose two lateral edges, related to the surface of the lens 12, overlap one another as shown in FIG. 4.

An annular cover 19 is provided for covering the periphery of the lens 12 and according to the invention the cover 19 is formed with abutments 20 and 20' in such a manner that two abutments always cooperate with one end of the blade 17 which latter is connected with the arm 16 via a bolt 21 which engages the blade 17 in the region of its middle intermediate its ends. The arm 16 is so curved that its configuration is conformed to the marginal region of the light outlet opening.

When the arrangement illustrated in FIGS. 1 – 4 is operated, the arm 16 swivels about the axis 14' of the drive shaft 14 when the latter is driven. This causes the blade 17 to abut against the abutments 20' near one end position with its two end portions, and because the wiper arm 16 continues to move further until it reaches its reversing or end position, the blade is then bent in the direction of further movement of the arm 16, so that even the circular side portions of the lens 12 are wiped. In the opposite end position the blade 17 abuts against abutments 20 and the same result is achieved. The abutments 20 are higher than the blade 17 and are each provided with a retaining portion 20a which extends above the respective wiper blade end to prevent the latter from lifting-off when it assumes its rest position in which it abuts against abutments 20 as shown in FIG. 3.

Figure 5:
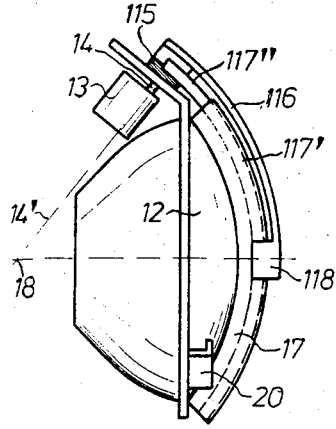
FIG. 5 is a side view of a further embodiment of the invention.

Coming to the embodiment illustrated in FIG. 5, it will be seen that here the wiper blade 17 has embedded in it a strip-shaped spring member 117' an end portion 117" of which extends outwardly of the wiper blade 17 at the end of the latter which faces towards the hub 115 by means of which the arm 116 is connected with the drive shaft 14. The remainder of the element 117' is embedded in the material of the blade 17. With this construction one abutment 20 and 20' each can be omitted. The drive movement is transmitted from the drive shaft on the arm 116 which is connected with the shaft by means of the hub 115, as already pointed out.

As shown in FIGS. 6 and 7 the free end of the arm 116 is provided with two mounting portions 118 which contact the side faces of the wiper blade 17 and between which the blade 17 is loosely guided. These portions 118 alternately push the blade 17 in one or the other direction over the surface of the lens 12, and because of this mounting the wiper blade 17 can readily become deformed into configuration with the marginal regions of the lens 12.

Figure 5A:
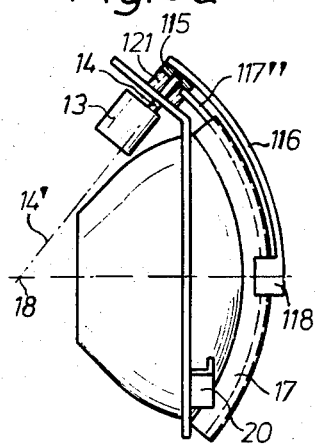
FIG. 5a is a still other embodiment of the invention, a view similar to FIG. 5.

As shown in FIG. 5a, it is also possible to connect the end portion 117 of the element 117' with a separate bushing 121 which is loosely turnably mounted on the drive shaft 14 downwardly of the hub 115 of the arm 116.

In the embodiment of FIGS. 8 - 10, finally, the portions 118 of the wiper arm 116 of FIG. 5 are replaced with portions 218 of the wiper arm which is here identified with reference numeral 216. In FIGS. 8 - 10, the portions 218 are so provided on the arm 216 that they engage the side surfaces of the wiper blade 17 in that end region of the latter which is adjacent the hub 15. The free end of the arm 216 is connected in this embodiment via a bolt 221 to the wiper blade 17, the bolt 221 extending towards the surface of the lens 12 and permitting bending or flexing of the entire wiper blade 17 as shown in FIG. 10. Because the two loci 221 and 218, which transmit the moving force from the wiper arm 216 into the blade 17, are spaced from another a particularly good wiping result is achieved.

It should be noted that in all embodiments the axis 14' of the drive shaft 14 must point in the direction towards the center of curvature 18 of the spherically curved lens 12, and of course it can advantageously intersect this center of curvature.

It will be understood that each of the elements described above or two or more together may also find a useful application in other types of constructions differing from the types described above.

While the invention has been illustrated and described as embodied in a wiper arrangement, it is not intended to be limited to the details shown, since various modifications and structural changes may be made without departing in any way from the spirit of the present invention.

Without further analysis, the foregoing will so fully reveal the gist of the present invention that others can, by applying current knowledge readily adapt it for various applications without omitting features that, from the standpoint of prior art, fairly constitute essential characteristics of the generic or specific aspects of this invention and therefore, such adaptations should and are intended to be comprehended within the meaning and range of equivalence of the following claims.

What is claimed as new and desired to be protected by Letters Patent is set forth in the appended claims.

We claim:

1. Wiping arrangement for use with windows having a curved periphery, particularly lenses on motor-vehicle lamps, comprising an elongated elastically deformable wiper blade having two spaced ends and a lip adapted to contact a surface of a window to be wiped; a mounting arm engaging said wiper blade and holding the same in position adjacent said surface, said mounting arm having a hub; a drive shaft connected with said hub of said mounting arm and being located closer to one of said ends than to the other end, said drive shaft being turnable for moving said mounting arm and wiper blade in alternately reversed directions over said surface; an elastic strip connecting said one end with said hub so that the latter constitutes an abutment for said wiper blade as the same reaches said periphery; and an additional abutment provided in the region of said periphery and positioned to cooperate with said other end, so that said wiper blade becomes elastically deformed in response to contact of said abutments with the respective ends and conforms itself to the shape of said arcuate periphery.

2. Wiping arrangement for use with windows having a curved periphery, particularly lenses on motor-vehicle lamps, comprising an elongated elastically deformable wiper blade having two spaced ends and a lip adapted to contact a surface of a window to be wiped; a mounting arm engaging said wiper blade and holding the same in position adjacent said surface, said mounting arm having a hub; a drive shaft connected with said hub of said mounting arm and being located closer to one of said ends than to the other end, said drive shaft being turnable for moving said mounting arm and wiper blade in alternately reversed directions over said surface; a bushing freely turnably surrounding said drive shaft below said hub; an elastic strip connecting said one end with said bushing so that the latter constitutes an abutment for said wiper blade as the same reaches said periphery; and an additional abutment provided in the region of said periphery and positioned to cooperate with said other end, so that said wiper blade becomes elastically deformed in response to contact of said abutments with the respective ends and conforms itself to the shape of said arcuate periphery.

3. Wiper arrangement as defined in claim 1, said abutments comprising two pair of abutments, each pair being adapted to cooperate with one of said ends.

4. Wiper arrangement as defined in claim 1, said abutments comprising at least two abutments for each of said ends and spaced from one another in the direction of movement of said wiper blade.

5. Wiper arrangement as defined in claim 1, said mounting arm having a pair of mounting portions located at opposite lateral sides of said wiper blade and loosely guiding the same between them.

6. Wiper arrangement as defined in claim 2, said mounting arm having a free end portion and including a bolt pivotably connecting said wiper blade with said free end, said bolt having a longitudinal axis directed towards said window; further comprising a hub for said mounting arm, and a pair of mounting portions provided on said mounting arm in the region of said hub and located at opposite sides of said wiper blade, loosely guiding the latter between them.

7. Wiper arrangement as defined in claim 1, said mounting arm having a configuration corresponding at least substantially to the contour of said periphery in the contact region of said wiper blade.

8. Wiper arrangement as defined in claim 1, said elastic strip being one portion of a strip of spring material, the remainder of which is embedded in said wiper blade.

9. Wiper arrangement as defined in claim 1, further comprising biasing means biasing said wiper blade in direction towards said surface.

10. Wiper arrangement as defined in claim 1, said elastic strip being one portion of a strip of spring material, the remainder of which is embedded in said wiper blade, said strip of spring material having two lateral edges which overlap one another.

* * * * *